T. M. BYRNES.
COMBINED TYPE BAR AND HANGER.
APPLICATION FILED MAR. 21, 1908.
936,089.
Patented Oct. 5, 1909.
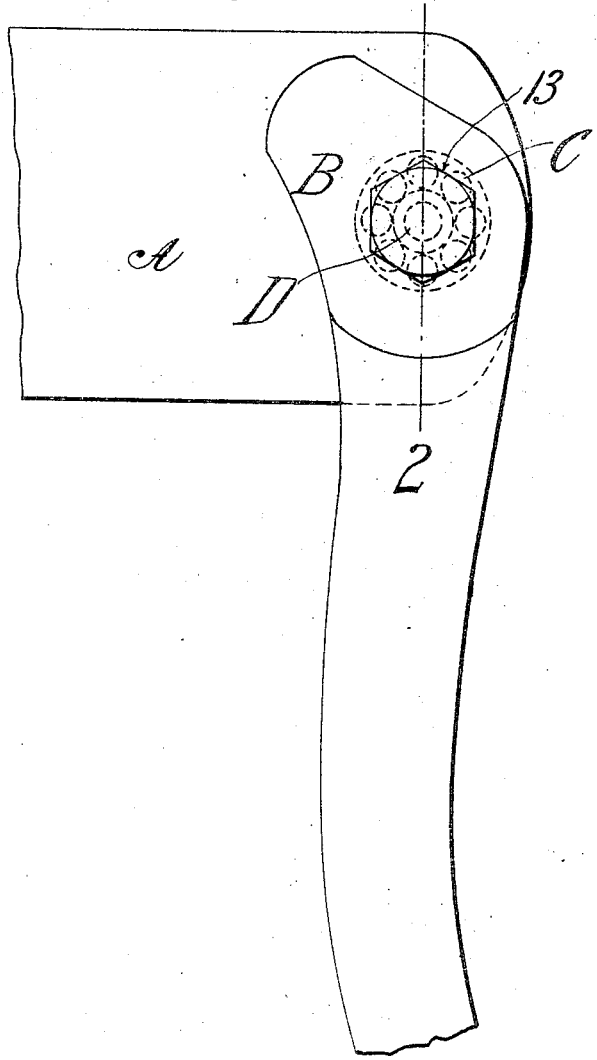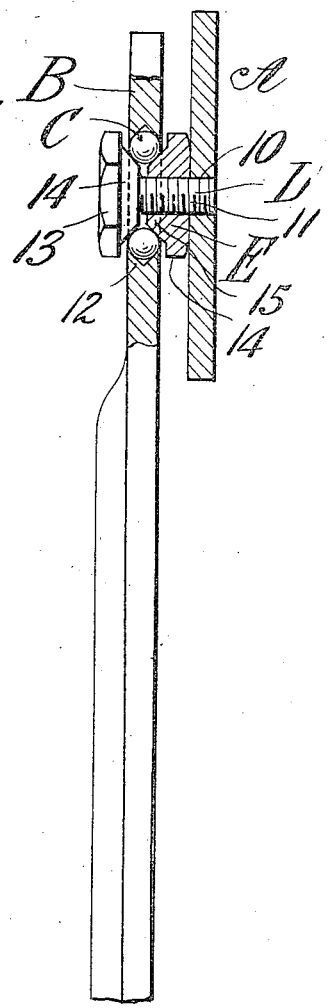
WITNESSES:
H L Sprague
R M Mowry
INVENTOR.
Thomas M. Byrnes.
BY
ATTORNEY.

UNITED STATES PATENT OFFICE.

THOMAS M. BYRNES, OF CHICOPEE, MASSACHUSETTS.

COMBINED TYPE-BAR AND HANGER.

936,089.

Specification of Letters Patent.

Patented Oct. 5, 1909.

Application filed March 21, 1908. Serial No. 422,477.

*To all whom it may concern:*

Be it known that I, THOMAS M. BYRNES, a citizen of the United States of America, and resident of Chicopee, in the county of Hampden and State of Massachusetts, have invented certain new and useful Improvements in Combined Type-Bars and Hangers, of which the following is a full, clear, and exact description.

This invention relates to improvements in a combined type-bar and hanger wherein ball bearings are comprised at the pivotal joint or journal which the type-bar has for its swinging movements relatively to the hanger; and the objects are to provide in a device of this character wherein the ball race and circular row of balls are in the type-bar, not only a lessened number of parts comprised in the ball bearing devices, but such an arrangement thereof that the transverse dimension of bolts, the hanger, and the type-bar related thereto, is extremely small, with no parts or elements which extend beyond or transversely from but one face or side of the hanger; and to provide that the means for the locking of the ball bearing adjustment, when such adjustment is satisfactorily effected, shall be constituted by an integral portion of one of the elements of the ball bearing which has its location between the inner face of the hanger and the adjacent side portion of the type-bar.

The invention consists in the parts having specific individual constructions and combined and arranged in a certain particular manner as hereinafter described in conjunction with the accompanying drawings and as set forth in the claim.

In the drawings,—Figure 1 is a side view of the type-bar and hanger. Fig. 2 is a sectional view on line 2—2, Fig. 1.

The drawings here provided are very much enlarged above the actual size of the device; and in this connection it will be stated that an important object being to obtain a construction of hanger and ball bearing type-bar having the smallest possible transverse dimension or thickness, owing to the limited space on the typewriter frame or segment on which the hangers are mounted, I am under the exercise of this invention enabled to construct the device so that the thickness through the same, inclusive of all of the equipments at the place of journal support for the type-bar is but 128/1000 of an inch.

In the drawings,—A represents the hanger constituted by a thin, metallic plate having a comparatively small circular screw-threaded aperture 10 therethrough.

B represents the type-bar arranged alongside of, and slightly separated from the face of the hanger; and the type-bar has a circular aperture 12 therethrough, the edge wall of which is constructed with a V-shaped groove, as shown in Fig. 2, to make a ball race; and C represents the single row of very minute balls therein.

D represents a screw of which the shank is of uniform diameter and having at its end a comparatively thin polygonal head 13 and a frusto-conical portion 14 next therewithin, the head being disposed adjacent the side of the type-bar, which is the farther from the hanger, the cone having an extension part way through the thickness of the type-bar in the marginally grooved aperture thereof and the extremity of the screw shank is adjustably screw engaged in the aforementioned small screw threaded hole 10 in the hanger. The only other element comprised in the device is constituted by that represented at E, the same consisting of a nut comprising a polygonal enlargement 14 and a frusto-conical shaped portion 15 integral therewith, screw engaged on the shank 11 of the screw D, the conical portion being entered part way through the thickness of the type-bar, in the aperture 12 therein and opposed to the conical portion 14 in proper relation to the inclosed balls, while the polygonal portion or enlargement 14 of the nut is located in the narrow space between the type-bar and hanger and is adapted to have an adjustment-locking bind against that side of the hanger which is toward the type-bar,—or in other words, against the inner side or face of the hanger.

In the assembling and adjustment of the parts the combined nut and cone E is brought to its place of screw engagement on the shank of the screw in screw including element D and approximately in proper adjustment relatively to the ball. The extremity of the screw is then engaged in the threaded opening 10 in the hanger but does not protrude beyond the outer face of the latter. The assembler or adjuster by the dextrous employment of thin wrenches used in both hands turns both the screw comprising element D, to bring the portions 14 and 13 and the type-bar suitably close to the inner face of the hanger, and to set the conical portion 15 of the element E to a somewhat harder bind against the balls than is appropriate for the desired freedom of action in the ball bearing type-bar support. The parts now having, as the skill and experience of the adjuster will determine, the proper juxtaposition, the nut E is given a slight turning movement in a direction to at once slightly relieve the cone pressure against the balls (so that the ball bearings will have the proper closeness of working relations and yet the desirable freedom for easy movements and a good "feeling") and, by the hard contact of the outer face of the nut against the inner face of the hanger effect the reliable and permanent locking of the ball bearing parts in their nice adjustments.

I am aware that it has been proposed to construct a type-bar with an integrally formed trunnion-like member comprising a cone and screw shank extension, to be introduced through and beyond a ball race opening in a hanger, a companion cone being adjustable on a screw and locked by a separately formed nut also engaging on the screw and constituting a projection beyond, and outside of the hanger; and also that it has been proposed to construct a type-bar with an aperture therethrough for balls together with a cone and screw, the shank of the latter protruding through and beyond the outside of the hanger, the companion cone engaging on the screw within the aperture in the type bar and interlocked with, and non-rotative relatively to, the hanger, and a nut additional to and formed separately from the companion cone and having its location and engagement with the screw outside of the hanger; but from neither of these constructions may be derived all of the advantages of the present device, nor is the manner of effecting the locking adjustment, which has been hereinabove particularly explained, permissible in the constructions just above referred to as having been heretofore proposed.

I claim:—

The combination with a hanger comprising a thin plate having a circular screw threaded aperture therethrough, of a type bar alongside of, and slightly separated from, the face of the hanger, having a circular aperture therethrough, the edge wall of which is constructed with a groove to make a ball-race, and balls therein, a screw having at one end a polygonal head, and a frusto-conical portion next therewithin, the head being disposed adjacent the side of the type bar which is the farther from the hanger, the cone being entered part way through the thickness of the type bar in the aperture thereof, and the extremity of the screw being adjustably screw-engaged in the hanger, a nut, comprising a polygonal enlargement and a frusto-conical shaped portion integral therewith, screw-engaged on the shank of the screw, the conical portion being entered part way through the thickness of the type-bar in the aperture therein, against the balls, while the polygonal portion of the nut is located in the narrow space between the type-bar and hanger and has an adjustment-locking bind against the side of the hanger which is toward the type bar.

Signed by me at Springfield, Mass., in presence of two subscribing witnesses.

THOMAS M. BYRNES.

Witnesses.
EMERSON G. GAYLORD,
WM. S. BELLOWS.